H. C. McBRAIR.
TRANSMISSION GEARING.
APPLICATION FILED APR. 28, 1909.
1,023,862.
Patented Apr. 23, 1912.
2 SHEETS—SHEET 1.
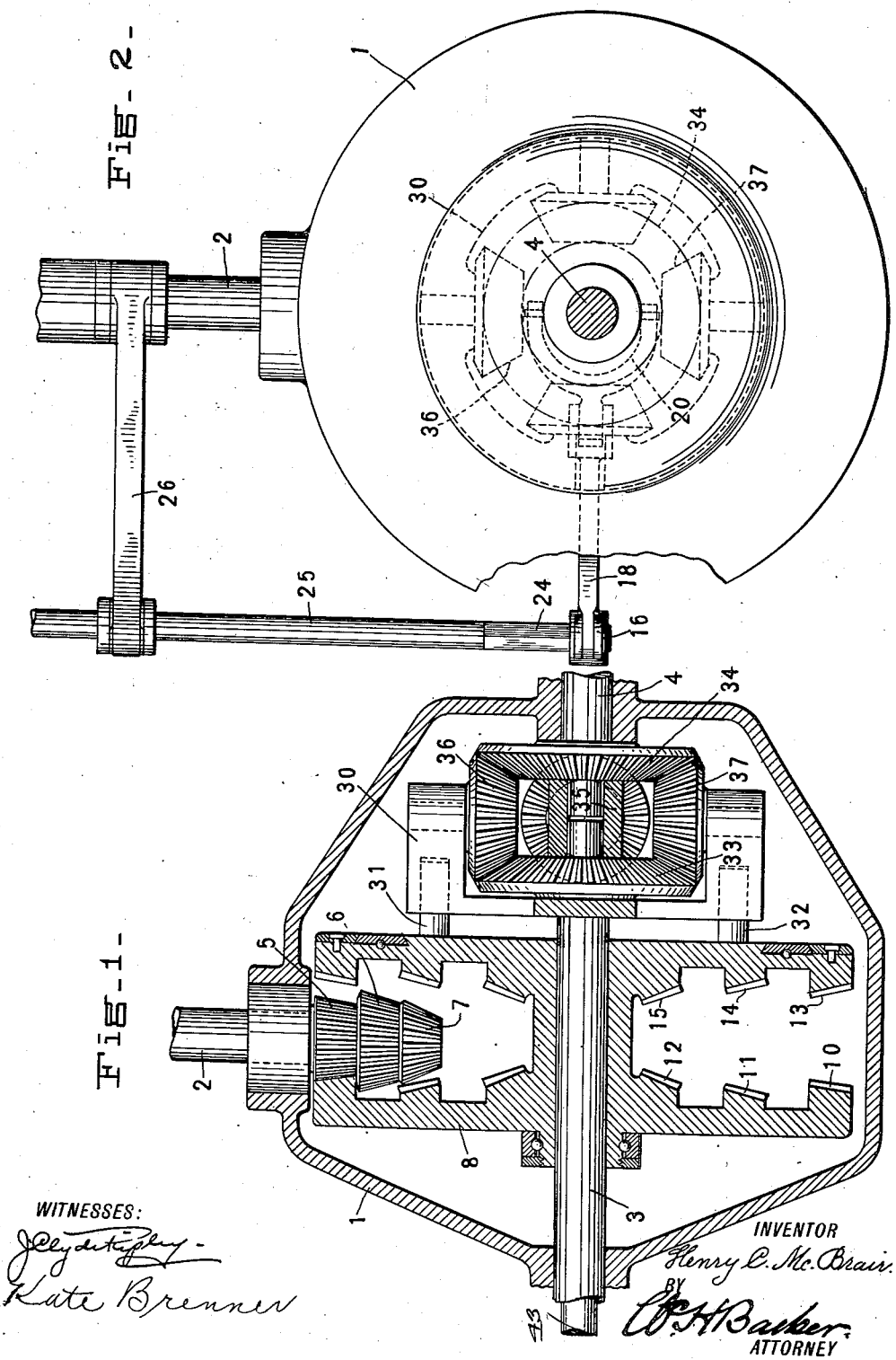
WITNESSES:
INVENTOR
Henry C. McBrair.
BY
W. H. Barker.
ATTORNEY H. C. McBRAIR.
TRANSMISSION GEARING.
APPLICATION FILED APR. 28, 1909.
1,023,862.
Patented Apr. 23, 1912.
2 SHEETS—SHEET 2.
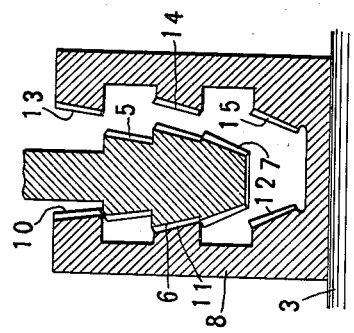
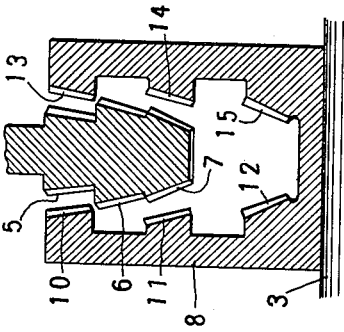
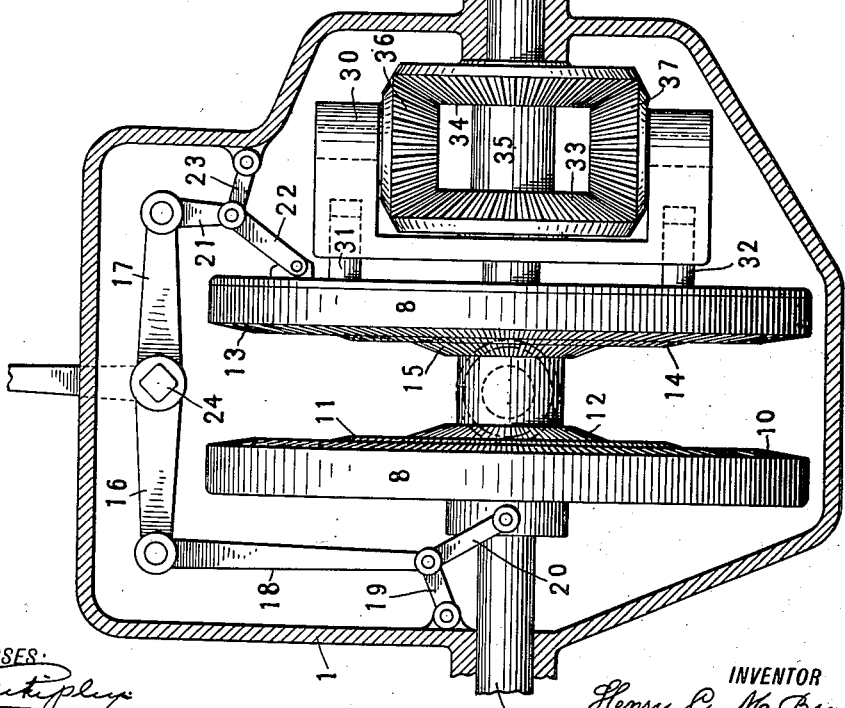
WITNESSES:
INVENTOR
Henry C. McBrair
BY
W. H. Backer
ATTORNEY

UNITED STATES PATENT OFFICE.

HENRY C. McBRAIR, OF MIDDLETOWN, NEW YORK, ASSIGNOR TO DIRECT DRIVE GEAR COMPANY, OF PATERSON, NEW JERSEY, A CORPORATION OF NEW JERSEY.

TRANSMISSION-GEARING.

1,023,862.   Specification of Letters Patent.   Patented Apr. 23, 1912.

Application filed April 28, 1909. Serial No. 492,676.

*To all whom it may concern:*

Be it known that I, HENRY C. McBRAIR, a citizen of the United States, and a resident of Middletown, in the county of Orange and State of New York, have invented certain new and useful Improvements in Transmission-Gearing, of which the following is a full, clear, and exact description, whereby any one skilled in the art may make and use the same The invention relates to transmission gearing and more particularly to a variable speed transmission mechanism. That is, a transmission mechanism in which the relative speed of a driven shaft or shafts may be varied with relation to the speed of rotation of a driving shaft through the transmission mechanism.

The object of the invention is to provide a simple and economic arrangement whereby the driving shaft may be readily connected with the driven shaft to vary the relative rotation thereof with reference to the driving shaft.

A still further object is to secure, as far as possible, a direct driving effect from the main driving shaft to the main driven shaft or shafts providing for variable speeds upon the driven shaft, and a still further object is to combine the variable speed gearing in such manner as to effectively drive a two-part shaft with a differential movement of the driven shaft sections.

The invention is particularly well adapted for use in connection with shafts substantially at right angles to each other, wherein it is desired to drive one of said shafts from the other by direct connections through intermeshing gears in such manner that the driven shaft may be rotated at greater or less speeds with reference to the driving shaft.

Referring to the drawings Figure 1 is a sectional plan view of a device embodying the invention. Fig. 2 is a view in side elevation looking from the right of Fig. 1. Fig. 3 is a view looking from the bottom of Fig. 1, the casing being broken in section to better illustrate the construction. Fig. 4 illustrates the gear members in their neutral position with no driving effect between the driving shaft and driven shaft. Fig. 5 illustrates the intermediate driving position of the gears Fig. 6 illustrates the driving connection between the gears for the highest speed between the driving and driven shaft.

Fig. 7 illustrates the position of the gears driving the driven member in a reverse direction from that illustrated in Figs. 5 and 6, and with the intermeshing gears engaged for the intermediate speed ratio.

In transmission gearing, such as employed in automobiles, it has been common practice to use a driving shaft extending longitudinally of the vehicle from the source of power to a change speed gearing and then connecting the change speed gearing with the rear axle of the vehicle through intermeshing bevel gears. In some instances, the longitudinal driving shaft is connected with a transverse counter-shaft through the medium of change speed gearing and bevel gears. Thus, the variations in speed between the main shaft and the vehicle wheels has been effected by utilizing a change speed mechanism consisting of various couplets of gears, the commonest form being the sliding gear provided with means for selecting gears of different sizes to intermesh and effect the drive.

It is one of the principal objects of the present invention to obviate the ordinary change speed gearing and produce a variable drive effect between the main driving shaft and rear axle or counter-shaft, which will be self-contained and will give several optional speeds for the rear axle or counter-shaft directly through the use of a bevel gear drive.

In the accompanying drawings, the numeral 1, denotes a casing of any convenient form for inclosing the various parts of the mechanism. As shown herein, a driving shaft 2, has bearings in one side of the casing and a driven shaft, composed of two axially alined members 3, and 4, is suitably journaled in the casing. The main shaft 2, extends within the casing 1, and bears a series of gears 5, 6, and 7, which, as shown, are of the bevel gear type and differ as to pitch diameter and angularity of the teeth.

Any desired number of gears may be mounted upon the driving shaft dependent upon the number of speed ratios desired and the shaft 2, which bears these gears, is arranged to be shifted axially in order to bring one or another of said gears into proper position to be engaged by its corresponding mating gear. As shown herein, there are six mating gears arranged to coöperate with the three driving gears 5, 6, and 7. These gears are combined in, what may be termed, a driven gear 8, which is suitably mounted upon the driven shaft 3, so that it may slide thereon. The driven gear 8, consists of two opposed sets of gears, all of which are arranged concentric with reference to the axis of the driven shaft 3. One set 10, 11, and 12, provides for engagements respectively with the gears 5, 6, and 7, of the driving shaft 2, to rotate the shaft 3, in one direction. The second set 13, 14, and 15, is arranged to engage respectively with the gears 5, 6, and 7, of the driving shaft 2, to rotate the shaft 3, in the opposite direction from that secured by the intermeshing of the gears 5, 6, and 7, with either of the gears 10, 11, and 12. The gears 10, 11, 12, 13, 14, and 15, are all permanently arranged in relative position one with the other either by cutting said gears from a single piece of metal or forming them separately, or arranging them in some form of carrier which will hold them in fixed relation with reference to each other. Whether formed integrally one with the other or mounted in a carrier, the whole structure, as designated by the numeral 8, may be moved axially of the driven shaft 3, in order to secure an intermeshing engagement between one or another of the gears of the driven shaft with its respective gear upon the driving shaft.

As a convenient means of shifting the driven gear 8, a lever having arms 16, 17, is suitably connected at opposite sides of the gear or carrier 8. On one side, a pivoted link 18, is connected with a toggle comprising a link 19, and a yoke 20, the former pivotally connected to the casing 1, and the latter suitably connected with the gear 8. The lever arm 17, is connected through a pivoted link 21, with two members of a toggle 22, 23, the former suitably connected to act against the gear or carrier 8, and the latter pivotally connected with the casing 1, or other fixed devices. The center of the lever 16, 17, is provided with a squared perforation which fits over the squared end 24 of an operating and controlling shaft 25. This operating and controlling shaft is also connected through a lever 26, with the main shaft 2, in such manner that the main shaft may rotate freely, but will be controlled as to axial position by the axial movement of the shaft 25. Thus, the controlling shaft 25, may be moved, to move the shaft 2, and its driving gears 5, 6, and 7, without changing the position of the gear 8, comprising the several gears 10, 11, 12, 13, 14, and 15. At the same time, the shaft 25, will control the position of said gears when it is rotated. Upon rotation of the shaft 25, the toggle links 19, 20, and 22, 23, will act upon opposite sides of the gear 8, and will move the gear 8, in one direction or the other along the shaft 3, depending upon the direction of rotation of the shaft 25. It is obvious that the toggle links, connections and shaft are so arranged that they coöperate with each other to move the gear 8, and, of course, when one or the other set of the toggle links is fully depressed and straightened, the gear 8, will be, for the moment, locked against axial movement.

In Fig. 1, the gears 5, and 10, are shown as being in mesh, and in this position, the toggle links 19, 20, would be depressed, owing to the tilting of the lever arm 16, toward the driven shaft 3. In Fig. 4, the gears are shown in the normal position in which the driving shaft 2, will transmit no motion to the driven shaft 3, inasmuch as none of the gears 10, 11, 12, 13, 14, and 15, are in mesh with the gears 5, 6, and 7. In Fig. 5, the driving gear 6, is shown as in mesh with the gear 11, the gears 5 and 7, being clear of the remaining gears of the gear member 8. Thus, the driving shaft 2, will drive the gear member 8, through the intermediate gears 6, and 11. Fig. 6 illustrates the gear 7, in mesh with the gear 12, thus communicating the movement of the driving shaft 2, to the driven shaft at the highest speed. Fig. 7 illustrates the intermediate gear 6, in mesh with the gear 14, in which position, the driving shaft 2, will drive the driven shaft 3, in the reverse direction from that illustrated in Figs. 1, 5, and 6. It is, of course, apparent that either of the gears 5, 6, or 7, might be engaged with either of the gears 13, 14, 15, thus giving three different speed ratios between the driving shaft and the driven shaft when a reverse drive is desired.

From the above, it will be seen that an axial movement of the driven shaft 2, will move the gears 5, 6, and 7, into the proper position to be engaged by one of the several gears of the gear member 8. When the shaft has been sufficiently moved, a rotation of the controlling shaft 25, will move the gear member 8, axially of the shaft 3, and thus bring one of the gears of said gear member 8, into mesh with its respective gear of the driving shaft.

It will be observed by reference to Figs. 1, 5, 6 and 7 of the drawings that the gears carried by the driving shaft and the gears carried by the driven shaft are so related with reference to each other that when any two of the gears are in mesh all of the other gears are out of engagement. By having all of the gears of each shaft integral or structurally united so as to be movable together, and arranging them as just described, simple forms of adjusting mechanism may be employed, one for each set of gears.

When it is desirable to use a two-part shaft such as illustrated in Figs. 1 and 3, and particularly where a differential movement is necessary for the two shaft members, a differential gear is arranged intermediate the gear member 8, and the shaft sections. This differential gear, as shown, is of the ordinary type, having a carrier 30, suitably journaled upon the shaft section 3, and having pin-connections 31, 32, with the shiftable gear member 8, in such manner that the carrier 30, will be rotated simultaneously upon rotation of the gear member 8. A bevel gear 33, is secured to the shaft section 3, and a bevel gear 34, is secured to the shaft section 4, a suitable spacing and supporting coupling 35, being arranged about the ends of the shaft sections between the gears 33 and 34. These gears 33, 34, mesh with intermediate gears 36, 37, suitably journaled in the carrier 30. From this arrangement, it is apparent that a differential gear and the several gears for effecting a variable drive between the driving shaft and driven shaft are combined in a single structure and completely incased within the housing and casing 1. The driving shaft 2, may extend directly from the source of power into said casing and all of the various speed changes may be readily effected through the gear above defined.

The controlling shaft, 25, may be connected with any suitable means (not specifically shown herein) whereby its position and the position of the various gears operated thereby, may be controlled and locked, and in fact, the various details of the mechanism might be varied to a considerable extent, without departing from the spirit or intent of the invention, which contemplates several drives from the main shaft to the counter-shaft or axle through direct bevel gear connections.

What I claim as my invention and desire to secure by Letters Patent is:

1. In a transmission gearing, an axially movable driving shaft, a driven shaft, a plurality of gears rigidly connected with each other, mounted upon the driving shaft and movable axially therewith, a plurality of gears upon the driven shaft, each adapted for engagement with its mating gear upon the driving shaft, and means for shifting the gears along the driven shaft, the gears carried respectively by the driving and driven shafts being arranged as described, whereby when one mating set is in engagement all the others are positively maintained out of engagement.

2. In a transmission gearing, a driving shaft, a plurality of gears mounted thereon, a driven shaft, a plurality of concentrically arranged gears mounted thereon, and fixed with reference to each other, the gears of the driving shaft being axially movable, and connections for moving the gears of the driven shaft axially with reference to said shaft, said means including toggle connections for locking the gears of the driven shaft in predetermined position.

3. In a transmission gearing, a driving shaft, a plurality of gears carried thereby, such gears being movable in the direction of the axis of the driving shaft, a driven shaft, a plurality of gears mounted thereon and arranged on opposite sides of the gears of the driving shaft, and connections for moving the gears of the driven shaft axially with reference to said shaft, such means including a double set of toggle connections engaging with the said movable gears from opposite sides.

4. In a transmission gearing, a driving shaft, a plurality of gears carried thereby, such gears being movable in the direction of the axis of the driving shaft, a driven shaft, a plurality of gears mounted thereon, a casing inclosing the said gears, and means for moving the gears of the driven shaft axially with reference thereto, including toggle connections between the said gears and the casing.

5. In a transmission gearing, a driving shaft, a plurality of gears mounted thereon, a driven shaft transversely arranged with reference to said driving shaft, a plurality of concentrically arranged gears arranged on opposite sides of the gears of the driving shaft mounted upon the said driven shaft, connections for shifting the gears of the driven shaft into and out of engagement with the gears of the driving shaft, a balance gear toward and from which the gears on the driven shaft are movable and adjustable power-transmitting connections between the said driven shaft gears and the balance gear.

6. In a transmission gearing, a driving shaft, a plurality of gears mounted thereon and transversely movable with reference to a driven shaft, a driven shaft having a plurality of concentric gears arranged on opposite sides of the gears of the driving shaft, means for moving said gears axially of the driven shaft, a differential gear mounted on the driven shaft, the said gears on the driven shaft being bodily movable with reference to the said differential gear, adjustable power-transmitting connections between the gears of the driven shaft and the said differential gear and means for adjusting and locking one of the gears of the driving shaft in meshing position with one of the gears of the driven shaft.

HENRY C. McBRAIR.

Witnesses:
 JOHN BRIGHT,
 RUFUS C. MALTBY.